US007995228B2

(12) United States Patent
Martin (10) Patent No.: US 7,995,228 B2
(45) Date of Patent: Aug. 9, 2011

(54) JAVA 2 PLATFORM ENTERPRISE EDITION (J2EE) BASED WEB PUBLISHING

(75) Inventor: Craig W. Martin, Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 1360 days.

(21) Appl. No.: 11/523,262

(22) Filed: Sep. 18, 2006

(65) Prior Publication Data

US 2008/0068633 A1 Mar. 20, 2008

(51) Int. Cl.
*G06F 15/00* (2006.01)
(52) U.S. Cl. ....... 358/1.15; 358/1.16; 709/219; 715/234
(58) Field of Classification Search .................. 358/1.15, 358/1.16; 709/219; 715/234
See application file for complete search history.

(56) References Cited

U.S. PATENT DOCUMENTS

| 6,560,621 B2 | 5/2003 | Barile | 707/513 |
| 7,013,288 B1* | 3/2006 | Reifel et al. | 705/26 |
| 7,243,127 B2* | 7/2007 | Tabayoyon et al. | 709/206 |
| 2002/0135800 A1* | 9/2002 | Dutta | 358/1.15 |
| 2003/0018694 A1* | 1/2003 | Chen et al. | 709/200 |
| 2004/0088397 A1* | 5/2004 | Becker et al. | 709/223 |
| 2004/0250205 A1* | 12/2004 | Conning | 715/517 |
| 2005/0210379 A1* | 9/2005 | Weathersby et al. | 715/513 |
| 2006/0075442 A1* | 4/2006 | Meadow | 725/91 |
| 2007/0288247 A1* | 12/2007 | Mackay | 705/1 |

* cited by examiner

*Primary Examiner* — Twyler L Haskins
*Assistant Examiner* — Mark R Milia
(74) *Attorney, Agent, or Firm* — Kermit D. Lopez; Luis M. Ortiz; Kevin Soules (57) ABSTRACT

A web publishing method using J2EE based controller. User submits an image from a workstation and chooses "Print to Website" option as the media type. The image is converted into an image format (e.g. JPEG) that can be display in a browser. These images can then be transmitted through a new output channel that would package them into a J2EE EAR file. The J2EE EAR file would abide by all J2EE conventions for specifying the URL and user interfaces via Struts MVC (Model View Controller). The EAR file can then be dropped in the JBoss deployment directory where it would be made available to the user. The user can receive a prompt at the driver or client tool interface letting them know that printing was successful, presenting them with the new URL, and optionally asking them to password the new web site if so desired.

18 Claims, 7 Drawing Sheets

JAVA 2 PLATFORM ENTERPRISE EDITION (J2EE) BASED WEB PUBLISHING

TECHNICAL FIELD

Embodiments are generally related to image-processing systems and rendering devices, such as printers, photo-copy machines, scanners, fax machines and the like. Embodiments are also related to the field of secured web publishing method. Embodiments are additionally related to Java 2 Enterprise Edition (J2EE) based web publishing using web printer management tools.

BACKGROUND OF THE INVENTION

In general a print job is a transitory task that provides limited feedback, has little memory of the actual print process, and has limited options in terms of security. Currently, sharing information electronically is becoming increasingly prevalent. Yet the process of sharing information, especially if web-based, is more ad hoc in nature. What is needed is a more robust electronic sharing media type where output is optimized for web-based viewing.

The J2EE platform simplifies enterprise applications by basing them on standardized, modular components, by providing a complete set of services to those components, and by handling many details of application behavior automatically, without complex programming. The J2EE platform adds full support for Enterprise Java Bean (EJB) components, Java Servlets Application programming interface (API), Java Server Pages (JSP) and Extensible Markup Language (XML) technology. The J2EE standard includes complete specifications and compliance tests to ensure portability of applications across a wide range of existing enterprise systems capable of supporting the J2EE platform. In addition, the J2EE specifications now ensure Web services interoperability through support for the Web Services-Interoperability (WS-I) Basic Profile.

The prior art provides an EJB based enterprise printing architecture for secured printing. Features of Enterprise Java Bean (EJB), Enterprise Printing Bean (EPB), JAVA, J2EE, and document authoring are combined to enable a robust enterprise printing architecture. A Java object encapsulates a print job specification and provides a framework enabling access control to print jobs as well as providing audit capabilities. Print control languages can be specified using methods provided by the Java object. Actual process implementation can be supplied via a server enabling another layer of security and control. A user wanting to securely print a job supplies appropriate credentials to the print job bean to gain access to the content and print server credentials allow printing of the print job. The EJB API is extendable to enable all of the J2EE capabilities found on standard EJBs to be applied to print Jobs. Further, a new Java API provides a more powerful page description language than that found in other printing languages.

Other methods provide a World Wide Web (WWW) formatting for program output through print functions. An application creates a source file that can be formatted for web viewing and transmits the source file to print driver program. The output of the program is formatted for viewing on the WWW in response to the selection for WWW format.

The prior methods can be complex and costly. As sharing information electronically is becoming increasingly prevalent, a need exists for a web publishing method with improved security and accessibility that is both simple and low cost. The present invention is described in the context of J2EE implementation and use of Enterprise Archive (EAR) file for packaging the web accessible content. The EAR format is portable, low cost, and extensible to provide basic Portable document format (PDF-like) functionality. This is an easy method of casual web publishing, simpler than converting content to a web friendly format and transferring the file to a repository that builds on the users' familiarity with the network print paradigm. It is anticipated that this functionality would be controlled via feature key, hence revenue generating.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide improved image-processing systems and rendering devices, such as printers, photo-copy machines, scanners, fax machines and the like.

It is another aspect of the present invention to provide a method for secure web publishing.

It is a further aspect of the present invention to provide secure web publishing using web printer management tools.

In accordance with features of the present invention, A web publishing method enables a user to select a print to website option in a user interface, submit an image to be rendered to a controller wherein the image is converted into a format (e.g., JPEG) that can be displayed in a browser, package the image in a file than can be accepted by Java 2 Enterprise Edition (J2EE) conventions and deploy the image in an application server.

In accordance with additional features, the user is notified of the deployment status for said image and is presented a (URL) for a website where said image is deployed.

In accordance with another feature, a password can be set for access to the file from said application server.

The aforementioned aspects and other objectives and advantages can now be achieved wherein a user submits an image from a workstation and chooses "Print to Website" option as the media type. The image is converted into a standard format (e.g. Joint Photographic Experts Group (JPEG)) that can be displayed in a browser. These images can then be funneled through a new output channel that would package them into a J2EE EAR file. The J2EE EAR file would abide by all J2EE conventions for specifying the Uniform Resource Locator (URL) and user interfaces via Struts MVC (Model View Controller). The EAR file would then be dropped in a JBoss deployment directory where it would be made available to the user. The user can receive a prompt at the driver or client tool interface letting them know that printing was successful, presenting them with the new URL, and asking them to password-protect the new web site if so desired.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Note that the embodiments disclosed herein can be implemented in the context of a host operating system and one or more software modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally comprise instruction media storable within a memory location of an image-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media. An example of such a module is module 122 depicted in FIG. 1.

It is important to note that, although the present invention is described in the context of a fully functional image-processing apparatus (e.g., a computer system), those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

The embodiments disclosed herein may be executed in a variety of systems, including a variety of computers running under a number of different operating systems. The computer may be, for example, a personal computer, a network computer, a mid-range computer or a mainframe computer. In the preferred embodiment, the computer is utilized as a control point of network processor services architecture within a local-area network (LAN) or a wide-area network (WAN).

Figure 1:
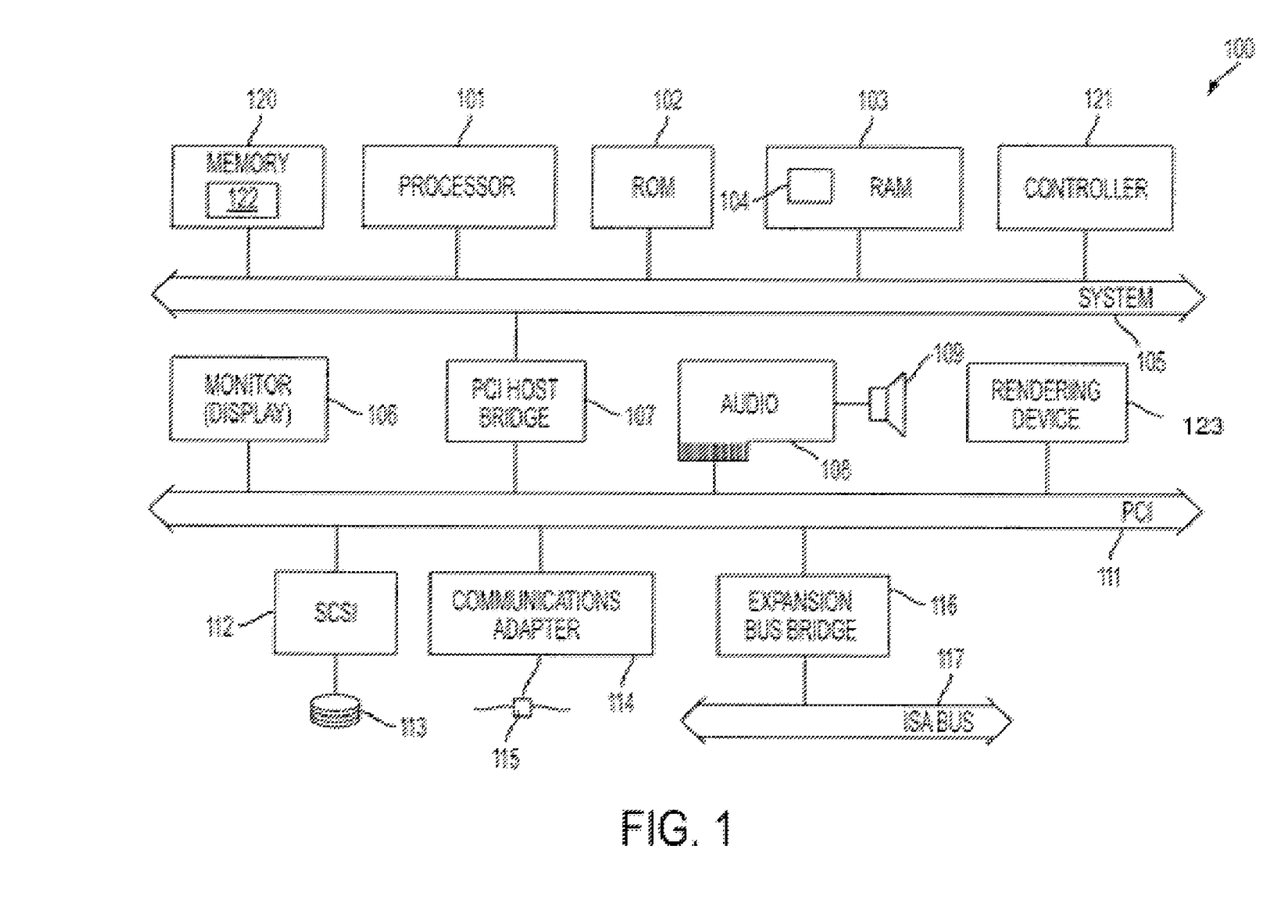
FIG. 1 illustrates a block diagram of a representative image-processing apparatus in which a preferred embodiment can be implemented.

Referring now to the drawings and in particular to FIG. 1, there is depicted a block diagram 100 of a representative image-processing apparatus 100 (e.g., a computer) in which a preferred embodiment can be implemented. As shown, processor (CPU) 101, Read-Only Memory (ROM) 102, an accxes controller 121 and Random-Access Memory (RAM) 103 are connected to system bus 105 of image-processing apparatus 100. The controller 121 uses J2EE based web printer management tool for secure web publishing. A memory 120 can also be included which includes a module 122 as described above. Memory 120 can be implemented as a ROM, RAM, a combination thereof, or simply a general memory unit. Depending upon the design of image-processing apparatus 100, memory 120 may be utilized in place of or in addition to ROM 102 and/or RAM 103.

Image-processing apparatus thus includes CPU 101, ROM 102, and RAM 103, which are also coupled to Peripheral Component Interconnect (PCI) local bus 111 of image-processing apparatus 100 through PCI host-bridge 107. PCI Host Bridge 107 provides a low latency path through which processor 101 may directly access PCI devices mapped anywhere within bus memory and/or input/output (I/O) address spaces. PCI Host Bridge 107 also provides a high bandwidth path for allowing PCI devices to directly access RAM 103. A rendering device or reproduction machine 123 for example printer is also connected to system bus 105. The rendering device or reproduction machine 123 can be implemented as provided as a rendering device, such as, for example, a laser jet printer, a photocopy machine, a fax machine, a scanner, and so forth, depending upon design considerations.

Also attached to PCI local bus 111 are communications adapter 114, small computer system interface (SCSI) 112, and expansion bus-bridge 116. Communications adapter 114 is utilized for connecting image-processing apparatus 100 to a network 115. SCSI 112 is utilized to control high-speed SCSI disk drive 113. Expansion bus-bridge 116, such as a PCI-to-ISA bus bridge, can be utilized for coupling ISA bus 117 to PCI local bus 111. In addition, audio adapter 108 can be attached to PCI local bus 111 for controlling audio output through speaker 109. Note that PCI local bus 111 can further be connected to a monitory 106, which functions as a display (e.g., a video monitor) for displaying image and information for a user and for interactively displaying a graphical user interface (GUI). In alternate embodiments, additional peripheral components may be added or existing components can be connected to the system bus. For example, the monitor 106 and the audio component 108 along with speaker 109 can instead be connected to system bus 105, depending upon design configurations.

Image-processing apparatus 100 also preferably includes an interface such as a graphical user interface (GUI) and an operating system (OS) that reside within machine readable media to direct the operation of image-processing apparatus 100. In the preferred embodiment, OS (and GUI) contains additional functional components, which permit network-processing components to be independent of the OS and/or platform. Any suitable machine-readable media may retain the GUI and OS, such as RAM 103, ROM 103, SCSI disk drive 113, and other disk and/or tape drive (e.g., magnetic diskette, magnetic tape, CD-ROM, optical disk, or other suitable storage media). Any suitable GUI and OS may direct CPU 101.

Further, image-processing apparatus 100 preferably includes at least one network processor services architecture software utility (i.e., program product) that resides within machine-readable media, for example a custom defined service utility 104 within RAM 103. The software utility contains instructions (or code) that when executed on CPU 101 interacts with the OS. Utility 104 can be, for example, a program product as described herein. Utility 104 can be provided as, for example, a software module such as described above.

Figure 2:
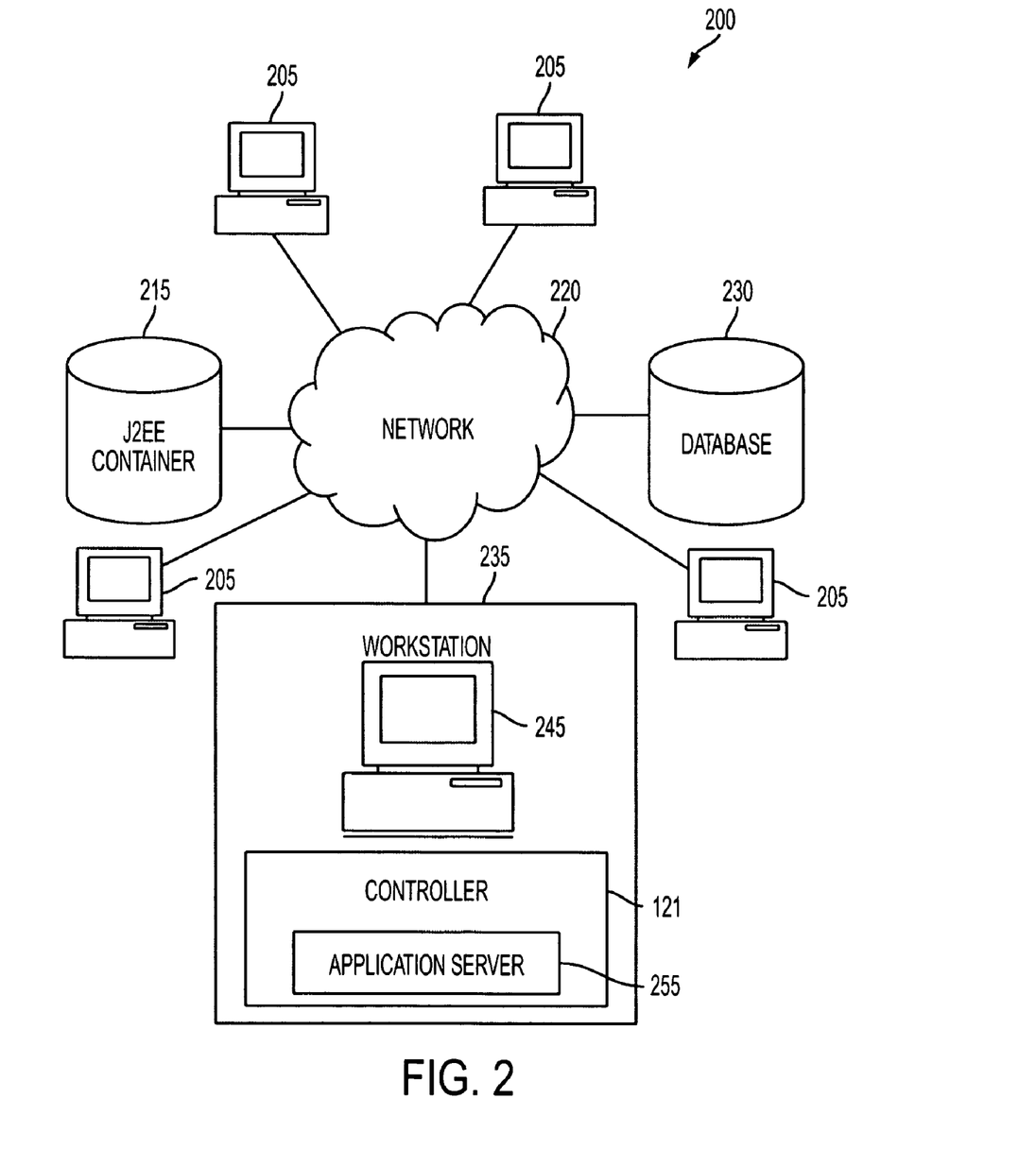
FIG. 2 illustrates a schematic block diagram of a web publishing system using a J2EE based web management tool, in which a preferred embodiment can be implemented.

FIG. 2 illustrates a schematic block diagram 200 of a web publishing system using J2EE based web management tools in a controller, in which a preferred embodiment can be implemented. A J2EE container 215, a database 230, an user interface 205 and a workstation 235 are connected to a network 220. The workstation 235 has an user interface 245 through which the user submits an image content to accxes controller 121 as depicted in FIG. 1 located in the workstation 235. The controller 121 as depicted in FIG. 1 has an application server 255 for deploying J2EE enterprise archive (EAR) file, which consists of image submitted my the user.

Figure 3:
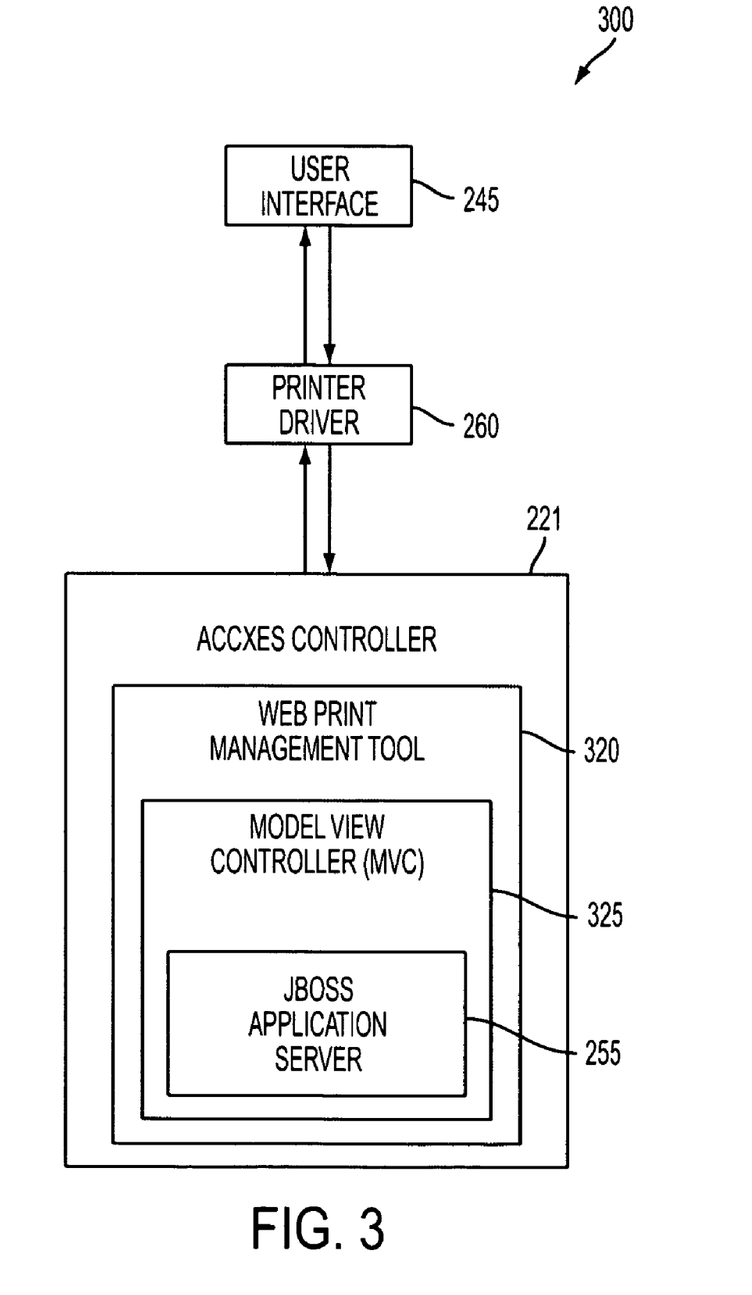
FIG. 3 illustrates a block diagram of a workstation using a J2EE based web management tool in a controller, which can be implemented in accordance with a preferred embodiment.

FIG. 3 illustrates a block diagram 300 of a workstation using a J2EE based web management tool in an Accxes controller 221, which can be implemented in accordance with a preferred embodiment. The user submits an image to printer driver 260 using user interface 245 depicted in FIG. 2. The printer driver 260 converts the image submitted by user to a format that can be interpreted by Accxes controller 221 as depicted in FIG. 1. The Accxes controller 221 as depicted in FIG. 1 converts the image interpreted by printer driver 260 to an EAR file and deploys the EAR file in a JBoss application server 255 using web print management tool 320 and model view controller (MVC) 325 design pattern.

Figure 4:
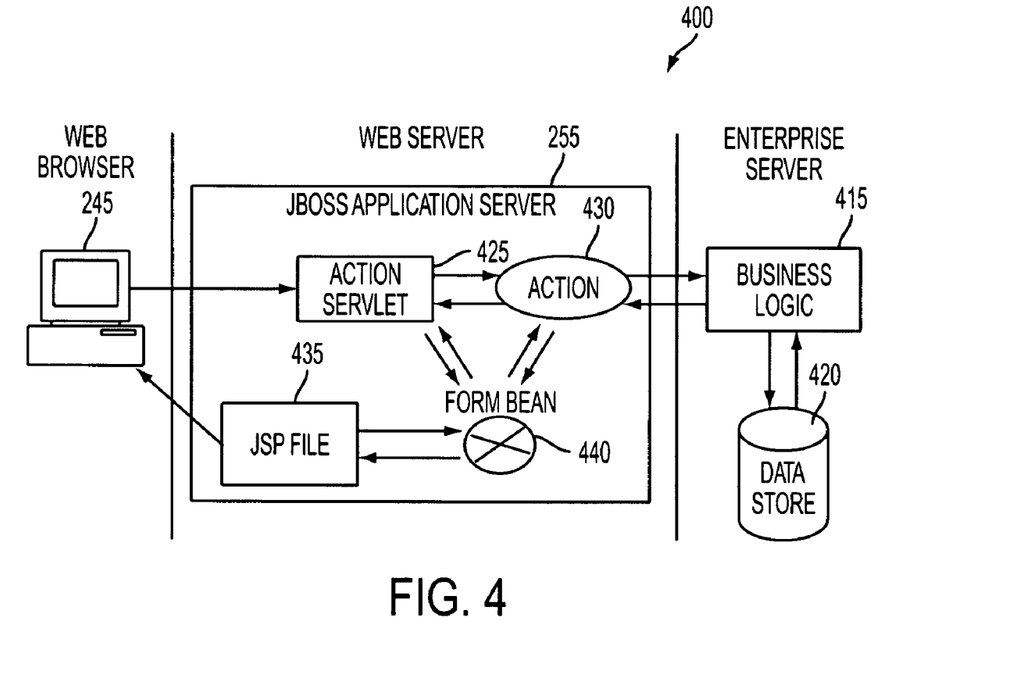
FIG. 4 illustrates a schematic block diagram of a Controller in which a preferred embodiment can be implemented.

FIG. 4 illustrates a schematic block diagram 400 of a Model View Controller (MVC), in which a preferred embodiment can be implemented. The model-view-controller 325 as depicted in FIG. 3, also known as Model 2 in J2EE application programming, is a well-established design pattern for programming. The model is the business logic 415, which in most cases involves access of data stores 420 like relational databases. The view is the code that presents images and data on Web pages. The code comprises JSPs and the Java beans that store data for use by the JSPs. The controller is the code that determines the overall flow of the application. It comprises one or more Struts actions 430, configuration files, and servlets. The JBoss application server 255 as depicted in FIG. 2 in which the EAR file is deployed is also shown in FIG. 4.

The user interface 245 is generally created with JSP files 435 that do not per se contain any business logic 415. These pages represent the view component of MVC architecture. Forms and hyperlinks in the user interface that require business logic 415 to be executed are submitted to a request URL that is mapped to an action servlet 425. One instance of this servlet class exists and receives and processes all requests that change the state of a user's interaction with the application.

The action servlet 425 selects and invokes one or more actions 430 to perform the requested business logic 415. The actions manipulate the state of the application's interaction with the user, typically by creating or modifying Java beans that are stored as request or session attributes (depending on how long they need to be available). Such Java beans represent the model component of MVC architecture. Instead of producing the next page of the user interface directly, actions generally pass control to an appropriate JSP file to produce the next page of the user interface.

A form bean 440 is a type of Java bean. A form bean 440 is an instance of a subclass of an Action Form class, which stores HTML form data from a submitted client request or that can store input data from a Struts action link that a user clicked. An HTML form comprises fields in which the user 405 can enter information.

Figure 5:
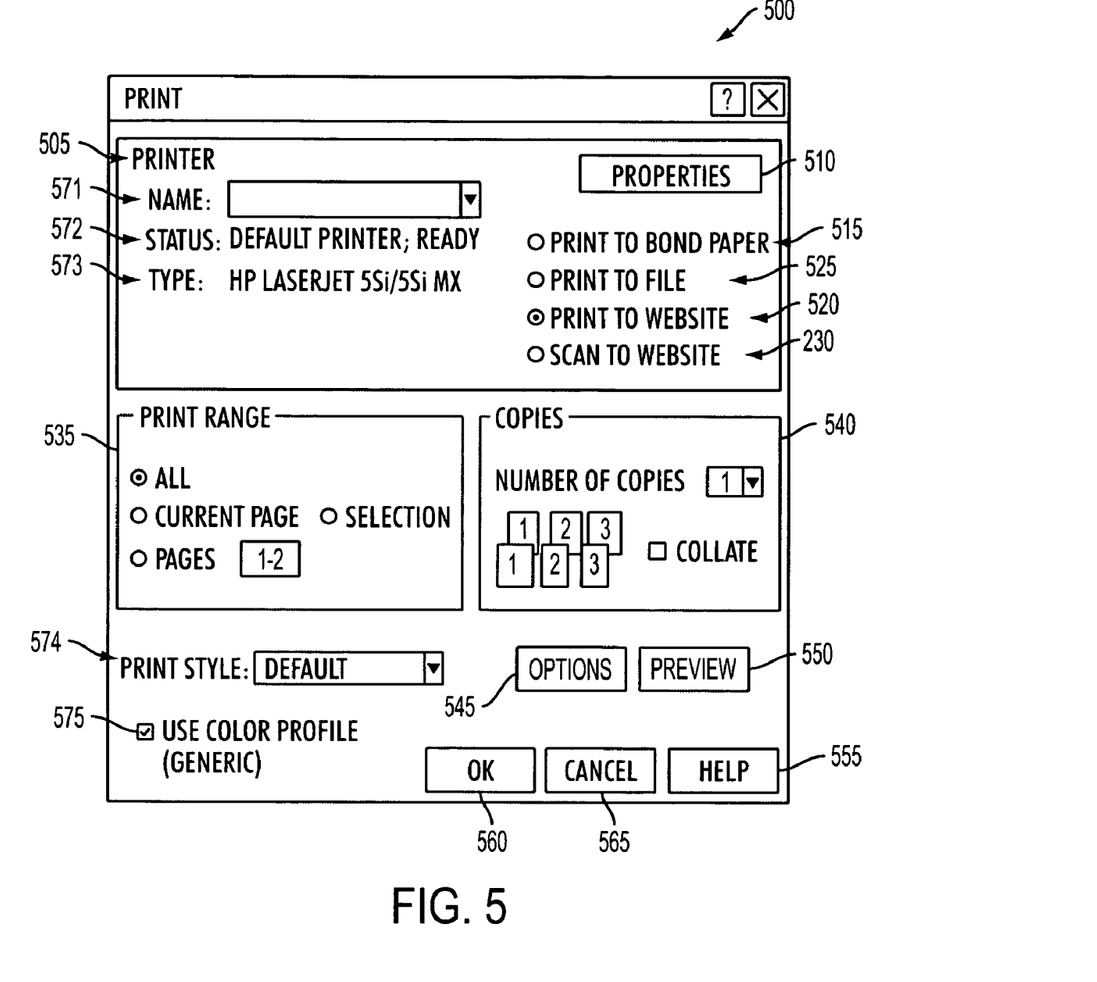
FIG. 5 illustrates a print dialog box of an user interface displayed when an user selects a print option in an interface, which can be implemented in accordance with preferred embodiment.

FIG. 5 illustrates a print dialog box 500 of a user interface 245 as depicted in FIG. 2 displayed when a user selects print option in the interface, which can be implemented in accordance with preferred embodiment. A printer details section 505 describes a name 571, a status 572, a type 573, and properties 510 of a printer. The printer details section 505 also describes a type of an output media such as print to band paper 515, print to file 525, print to website 520 and scan to website 530. The user can select the name 571, the status 572, the type 573, properties 510 and the output media according to the print image data.

The user can select the number pages by selecting any one of the options from all, current page, selection, and pages in print range section 535. The user can also select number of printouts to be taken as said at block 540. The user can also specify the page arrangement by checking or un-checking the collate check box. The user can select the print style and color profile usage as said at block 574 and 575 respectively.

The option button 545 includes options for current document, options for duplex printing and features to be includes in documents etc., The user can preview the submitted image by clicking the preview button as said at block 550. The user can get a help, cancel the print and print the submitted image data by clicking Help, OK and Cancel buttons as said at blocks 555, 560 and 565 respectively.

Figure 6:
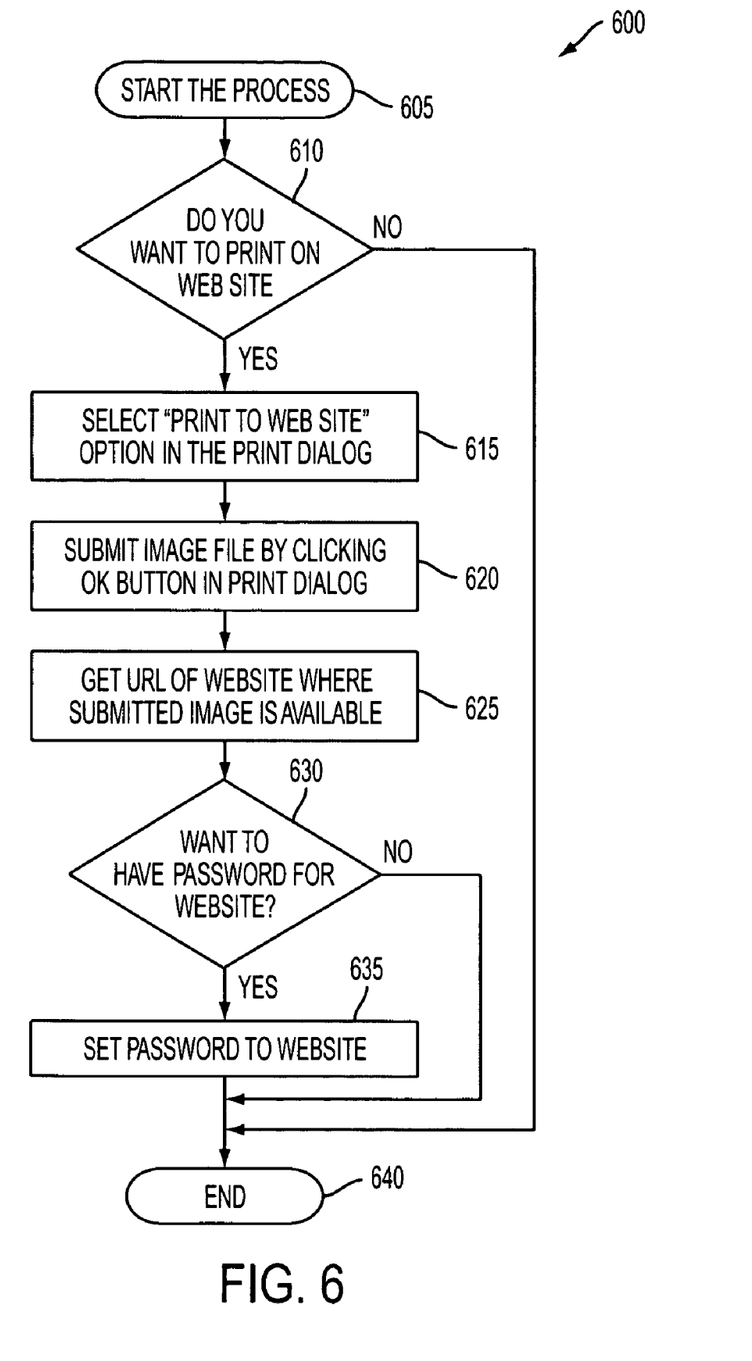
FIG. 6 illustrates a high level flow chart of a web publishing process performed by an user in which a preferred embodiment can be implemented.

FIG. 6 illustrates a high level flow chart 600 of web publishing process performed by a user in which a preferred embodiment can be implemented. The web publishing process starts as shown at block 605. As said at block 520, if a user wants to print on website as indicated at block 610, the user can select print to website option as shown at block 615. Thereafter as described at block 620, the user can submit the image file for web publishing by clicking OK button 560 as depicted in FIG. 5. The user receives URL of the website as shown in block 625 where the submitted image information is available. The user can set a password as shown in block 630. Thereafter as shown at block 635, the password can be set to the website; otherwise, the method can proceed to block 640. Finally, as shown at block 640, the web publishing process performed by user ends.

Figure 7:
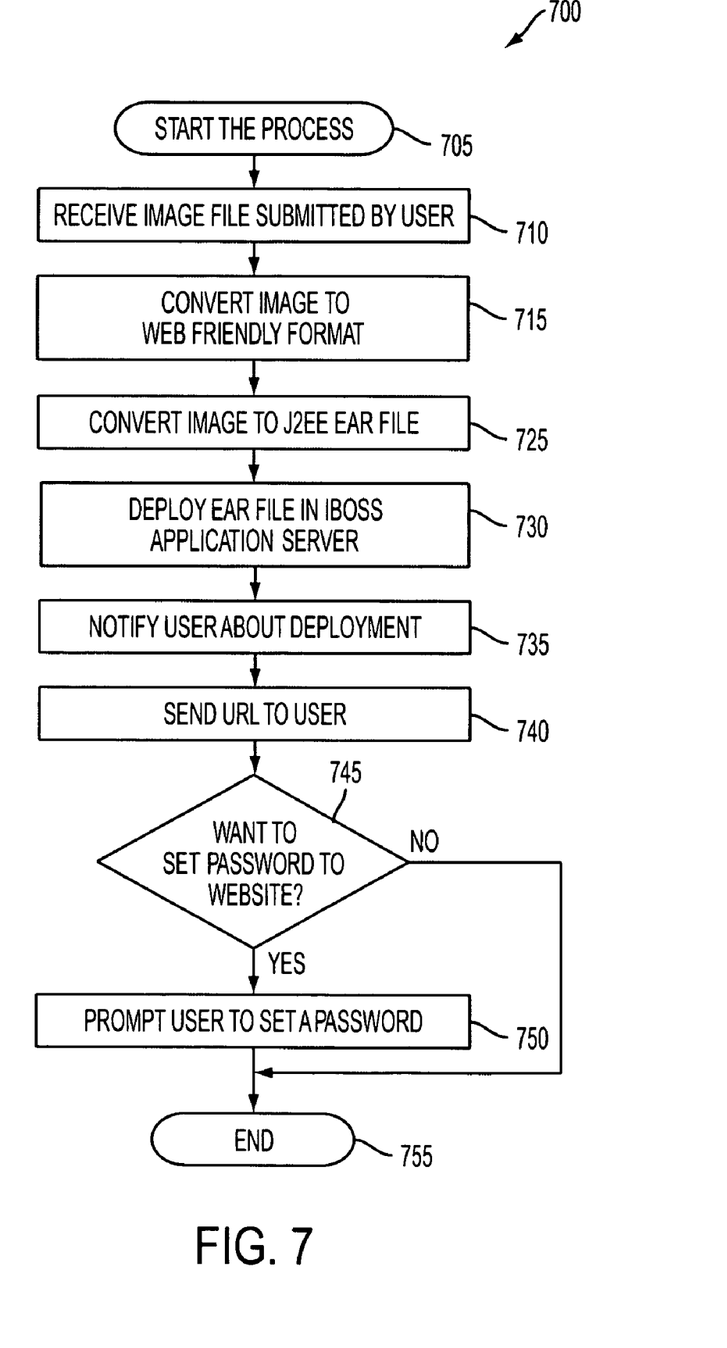
FIG. 7 illustrates a high level flow chart of a web publishing process performed by a system in which a preferred embodiment can be implemented.

FIG. 7 illustrates a high level flow chart 700 of web publishing process performed by a system in which a preferred embodiment can be implemented. The system depicted in FIG. 1, starts at block 705 and receives an image file submitted by the user as shown at block 710. The submitted image file is converted to a web friendly format as shown at block 715 and then is converted into J2EE EAR file as shown at block 725. Thereafter as described at block 730 the EAR file is deployed in JBoss application server and as said at block 735 a notification is given to user about deployment as shown in block 740. After notifying about deployment the system the user is prompted whether to set a password or not as described at block 745. The password can be to the website, if the user wish to set as described at block 750. Finally, the web publishing process performed my user ends as said at block 755.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer implemented web publishing method, comprising:
   selecting a print to a website option in a user interface of a reproduction machine;
   submitting an image to be rendered at said website to a reproduction machine driver;
   converting said image at the reproduction machine driver into a format that can be displayed in a browser;
   packaging said image in a file that can be accepted by Java 2 Enterprise Edition (J2EE) conventions; and
   deploying said image in an application server.

2. The method of claim 1, wherein the format said image is converted into is the Joint Photographic Experts Group (JPEG) format.

3. The method of claim 1, further comprising:
   notifying a user of deployment status for said image; and
   presenting a (URL) for a website to the user where said image is deployed.

4. The method of claim 2, further comprising:
   notifying a user of deployment status for said image; and
   presenting a (URL) for a website to the user where said image is deployed.

5. The method of claim 3, wherein the format said image is converted into is the Joint Photographic Experts Group (JPEG) format.

6. The method of claim 1 further comprising setting a password for access to said website.

7. The method of claim 3 further comprising setting a password for access to said website.

8. The method of claim 4 further comprising setting a password for access to said website.

9. A web publishing method carried out by a user at a computer-networked workstation, comprising:
   selecting an image from a workstation and choosing a "Print to Website" option at a software user interface of a printer to submit the image for rendering at a website;
   converting the image at said printer into a standard format that can be displayed in a browser;
   deploying the image by packaging the image into a J2EE file and storing the J2EE file in an application server; and
   notifying the user of image deployment status and presenting a URL of a website wherein the image is deployed.

10. The method of claim 9, wherein the format said image is converted into is the Joint Photographic Experts Group (JPEG) format.

11. The method of claim 9, further comprising setting a password for access to said website.

12. The method of claim 11, wherein the format said image is converted into is the Joint Photographic Experts Group (JPEG) format.

13. The method of claim 10, further comprising setting a password for access to said website.

14. A computer implemented J2EE base web publishing method, comprising:
   selecting a print to a website option in a user interface of a reproduction machine;
   submitting an image to be rendered at said website to a reproduction machine driver;
   converting said image at the reproduction machine driver to a standard format that can be displayed in a browser;
   packing said standard format to a file than can be accepted by all Java 2 Enterprise Edition (J2EE) conventions; and
   deploying said file in an application server.

15. The method of claim 14, further comprising:
   notifying status of deployment;
   presenting a (URL) of a website where said image is deployed; and
   setting a password for access to said website.

16. The method of claim 14, wherein said file is Java 2 Enterprise Edition (J2EE) enterprise archive (EAR) file.

17. The method of claim 14, wherein said application server is a JBoss application server.

18. The method of claim 14, wherein said reproduction machine driver is a J2EE based Accxes Controller.

* * * * *